US008606888B2

(12) United States Patent
Savolainen et al.

(10) Patent No.: US 8,606,888 B2
(45) Date of Patent: Dec. 10, 2013

(54) ASSIGNMENT OF A COMMON NETWORK ADDRESS TO MULTIPLE NETWORK INTERFACES OF A COMPUTING OFFICE

(75) Inventors: Teemu Savolainen, Nokia (FI); Domagoj Premec, Zagreb (HR)

(73) Assignee: Nokia Solutions and Networks Oy, Espoo (FI)

( * ) Notice: Subject to any disclaimer, the term of this patent is extended or adjusted under 35 U.S.C. 154(b) by 248 days.

(21) Appl. No.: 13/133,620

(22) PCT Filed: Dec. 10, 2008

(86) PCT No.: PCT/IB2008/055217
§ 371 (c)(1),
(2), (4) Date: Jun. 8, 2011

(87) PCT Pub. No.: WO2010/067144
PCT Pub. Date: Jun. 17, 2010

(65) Prior Publication Data
US 2011/0246629 A1    Oct. 6, 2011

(51) Int. Cl.
*G06F 15/16*       (2006.01)
(52) U.S. Cl.
USPC .......................................... 709/220; 709/227
(58) Field of Classification Search
None
See application file for complete search history.

(56) References Cited

U.S. PATENT DOCUMENTS

| 2008/0082642 | A1* | 4/2008 | Wu | 709/222 |
| 2008/0256220 | A1* | 10/2008 | Bachmann et al. | 709/222 |
| 2009/0313118 | A1* | 12/2009 | Akiyoshi | 705/14.49 |
| 2010/0223365 | A1* | 9/2010 | Liebsch et al. | 709/221 |
| 2010/0268804 | A1* | 10/2010 | Aso et al. | 709/222 |

OTHER PUBLICATIONS

Devarapalli, V, et al., *Multiple Interface Support With Proxy Mobile IPv6 draft-devarapalli-netlmm-multihoming-03.txt*, NETLMM Working Group, Aug. 22, 2008, 15 pages.
Dundavelli, S. et al., *Proxy Mobile IPv6*, Network Working Group, RFC 5213, Aug. 2008, 90 pages.
Narten, T. et al., *Neighbor Discovery for IP Version 6 (IPv6)*, Network Working Group, RFC 4861, Sep. 2007, 97 pages.
Premec, D. et al., *Inter-technology handover in netlmm domain draft-premec-netlmm-intertech-handover-00.txt*, NETLMM Working Group, Apr. 26, 2008.
Wakikawa, R. et al., *The Use of Virtual Interface for Inter-technology Handoffs and Multihoming in Proxy Mobile IPv6*, Mobiworld, 2008, 6 pages.

(Continued)

*Primary Examiner* — John B. Walsh
(74) *Attorney, Agent, or Firm* — Squire Sanders (US) LLP

(57) ABSTRACT

A method, apparatus, and computer program product are provided for enabling assignment of a common network address to multiple network interfaces of a computing device attached to a network domain. An apparatus (302) may include a processor (310) configured to send a message to a mobility access gateway (306) comprising a request that a mobile host device (302) be assigned a common network address for simultaneous use on multiple network interfaces of the mobile host device through which the mobile host device is attached to the network domain. The processor may be further configured to receive a message comprising network address information from the mobility access gateway indicating that the mobile host device has been assigned a common network address for simultaneous use on multiple network interfaces of the mobile host device through which the mobile host device is attached to the network domain. Corresponding methods and computer program products are also provided.

20 Claims, 7 Drawing Sheets

(56) References Cited

OTHER PUBLICATIONS

Draft-ietf-mext-flow-binding-00—Flow Bindings in Mobile IPv6 and Network Mobility (NEMO) Basic Support [online] [retrieved May 13, 2011]. Retrieved from the Internet: <URL: http://tools.ietf.org/html/draft-ietf-mext-flow-binding-00>. 21 pages.

International Search Report and Written Opinion for Application No. PCT/IB2008/055217 dated Oct. 22, 2009.

draft-ietf-monami6-multiplecoa-00—Muliple Care-of Addresses Registration [online] [retrieved Sep. 19, 2011]. Retrieved from the Internet: <URL: http://tools.ietf.org/html/draft-ietf-monami6-multiplecoa-00>. 37 pages.

draft-ietf-mext-flow-binding-11—Flow Bindings in Mobile IPv6 and Network Mobility ( . . . [online] [retrieved Sep. 19, 2011]. Retrieved from the Internet: <URL: http://tools.ietf.org/html/draft-ietf-mext-flow-binding-11>. 39 pages.

Alexander, S. et al., *DHCP Options and BOOTP Vendor Extensions*, Network Working Group, RFC 2132, Mar. 1997, 32 pages.

\* cited by examiner

ASSIGNMENT OF A COMMON NETWORK ADDRESS TO MULTIPLE NETWORK INTERFACES OF A COMPUTING OFFICE

TECHNOLOGICAL FIELD

Embodiments of the present invention relate generally to communication technology and, more particularly, relate to methods, apparatuses, and computer program products for enabling assignment of a common network address to multiple network interfaces of a computing device attached to a network domain.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. Many computing devices are now configured to attach to a network domain and access network resources, such as, for example, web pages, over a plurality of available network interfaces. These network interfaces may include, for example, a cellular network interface, a wired Ethernet interface, a wireless local area network interface (e.g., Wifi interface), and/or the like. These available network interfaces may interface with various wireless access points and networks provided by devices within a network domain.

At least some network domains to which a computing device may attach and those which are relevant to the invention described herein provide network based mobility service (e.g., a network localized mobility management (netlmm) domain) to a mobile host device that is transparent to the mobile host device itself. A network domain may comprise a plurality of mobility access gateways, which may provide access to the network domain through different access networks (e.g., cellular access network, WiFi access network, and/or the like). Accordingly, a mobile host device having multiple network interfaces (e.g., a cellular access card and a WiFi access card) may attach to the same network domain through multiple network interfaces.

A mobile host device may further have one or more data flows (e.g., Internet Protocol data flows or sessions) established over one or more network interfaces through which the mobile host device is attached to a network domain. If the mobile host device is attached to the network domain through multiple network interfaces, it may be advantageous for the mobile host device to move an existing data flow to another network interface. For example, moving a hypertext transfer protocol data flow from a cellular network interface to a WiFi network interface may, for example, offer faster and/or cheaper network access than the cellular access. However, a mobile host device may not be able to move an existing data flow between network interfaces through which the mobile host device is attached to a network domain because existing standards for network domains providing network based mobility (e.g., the Proxy Mobile IPv6 (RFC 5213) specification) do not allow a mobile host device attached to a network domain to use multiple network interfaces at the same time with a common network address. In fact, RFC 5213 mandates that if a mobile host device is attached to a netlmm domain through multiple network interfaces, each network interface must be configured with a unique network address that is based on a different home network prefix (HNP). Thus, existing network domain standards prevent the movement of data flows between network interfaces Accordingly, it would be advantageous to provide methods, apparatuses, and computer program products for enabling assignment of a common network address to multiple network interfaces of a computing device attached to a network domain, which may address at least this deficiency and allow a computing device to move data flows between network interfaces.

BRIEF SUMMARY OF SOME EXAMPLES OF THE INVENTION

A method, apparatus, and computer program product are therefore provided for enabling assignment of a common network address to multiple network interfaces of a computing device attached to a network domain. In this regard, a method, apparatus, and computer program product are provided that may provide several advantages to a computing device having multiple network interfaces. Embodiments of the invention provide for assignment of a common network address to multiple network interfaces of a mobile host device on network domain, such as a network localized mobility management domain. Embodiments of the invention further enable movement of data flows, such as IP flows, between network interfaces of a mobile host device having a common network address. At least some embodiments of the invention allow dynamic negotiation of what network interface a type of data flow should be transmitted over.

In a first exemplary embodiment, a method is provided, which may include receiving, at a mobility access gateway on a network domain, a message from a mobile host device comprising a request that the mobile host device be assigned a common network address for simultaneous use on multiple network interfaces of the mobile host device through which the mobile host device is attached to the network domain. The method may further include sending a proxy binding update message to a local mobility anchor, wherein the proxy binding update message comprises an indication that the mobile host device requested to be assigned a common network address for use on multiple network interfaces of the mobile host device.

In another exemplary embodiment, a method is provided, which may include sending a message, from a mobile host device to a mobility access gateway on a network domain, comprising a request that the mobile host device be assigned a common network address for simultaneous use on multiple network interfaces of the mobile host device through which the mobile host device is attached to the network domain. The method may further include receiving a message comprising network address information from the mobility access gateway indicating that the mobile host device has been assigned a common network address for simultaneous use on multiple network interfaces of the mobile host device through which the mobile host device is attached to the network domain.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for receiving, at a mobility access gateway on a network domain, a message from a mobile host device comprising a request that the mobile host device be assigned a common network address for simultaneous use on multiple network interfaces of the mobile host device through which the mobile host device is attached to the network domain. The second program instruction is for sending a proxy binding update message to a local mobility anchor, wherein the proxy binding update message comprises an indication that the mobile host device requested to be assigned a common network address for use on multiple network interfaces of the mobile host device.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for sending a message, from a mobile host device to a mobility access gateway on a network domain, comprising a request that the mobile host device be assigned a common network address for simultaneous use on multiple network interfaces of the mobile host device through which the mobile host device is attached to the network domain. The second program instruction is for receiving a message comprising network address information from the mobility access gateway indicating that the mobile host device has been assigned a common network address for simultaneous use on multiple network interfaces of the mobile host device through which the mobile host device is attached to the network domain.

In another exemplary embodiment, an apparatus is provided, which may include a processor configured to receive, at a mobility access gateway on a network domain, a message from a mobile host device comprising a request that the mobile host device be assigned a common network address for simultaneous use on multiple network interfaces of the mobile host device through which the mobile host device is attached to the network domain. The processor may be further configured to send a proxy binding update message to a local mobility anchor, wherein the proxy binding update message comprises an indication that the mobile host device requested to be assigned a common network address for use on multiple network interfaces of the mobile host device.

In another exemplary embodiment, an apparatus is provided, which may include a processor configured to send a message, from a mobile host device to a mobility access gateway on a network domain, comprising a request that the mobile host device be assigned a common network address for simultaneous use on multiple network interfaces of the mobile host device through which the mobile host device is attached to the network domain. The processor may be further configured to receive a message comprising network address information from the mobility access gateway indicating that the mobile host device has been assigned a common network address for simultaneous use on multiple network interfaces of the mobile host device through which the mobile host device is attached to the network domain.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

Figure 5:
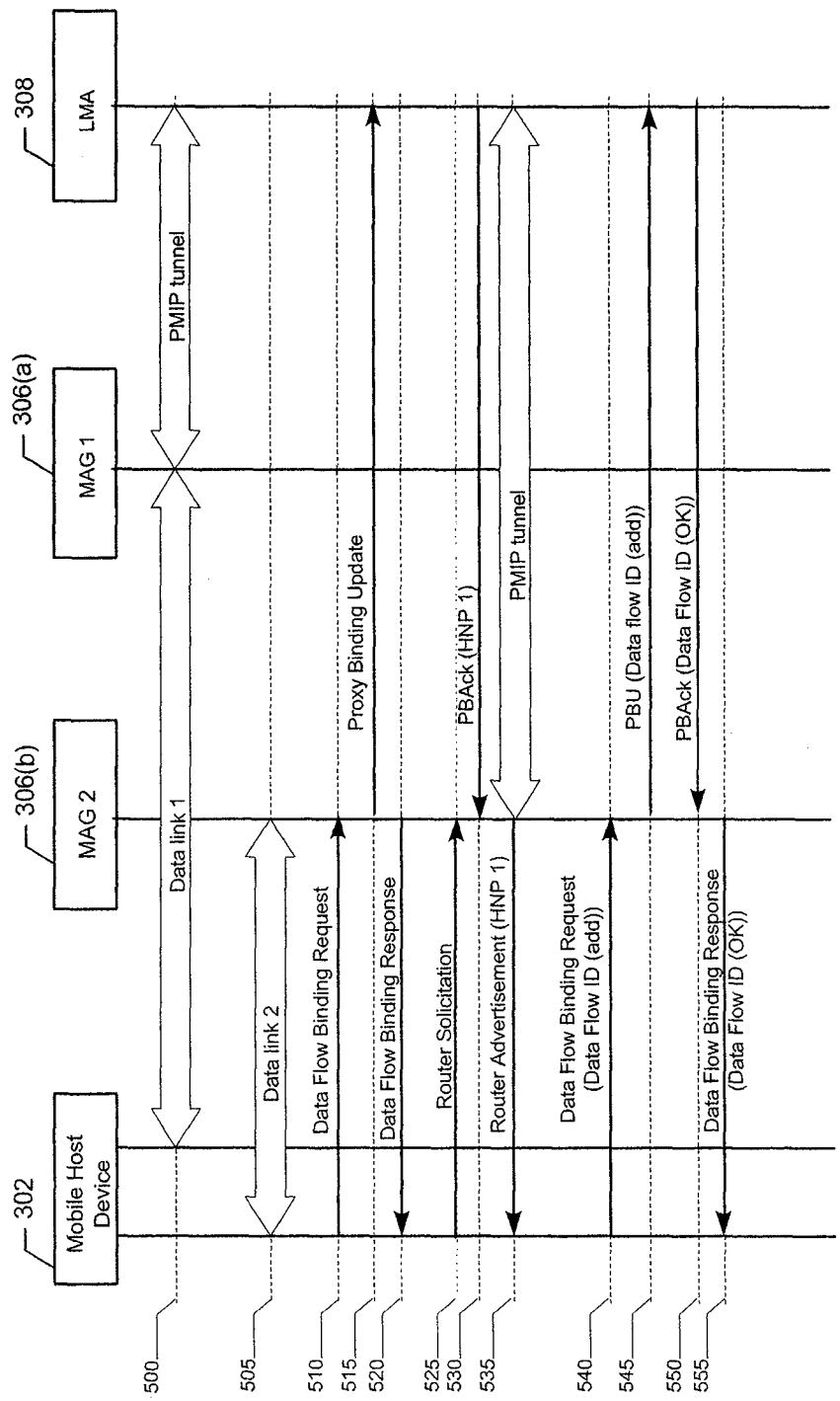
Figure 6:
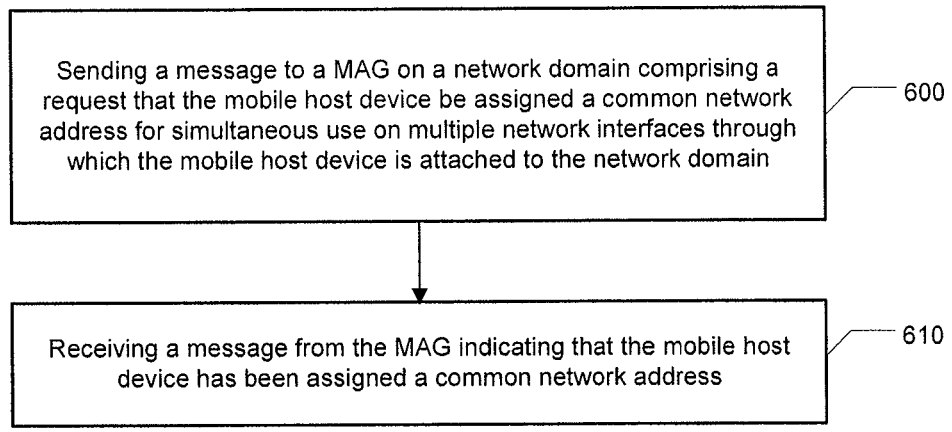
Figure 7:
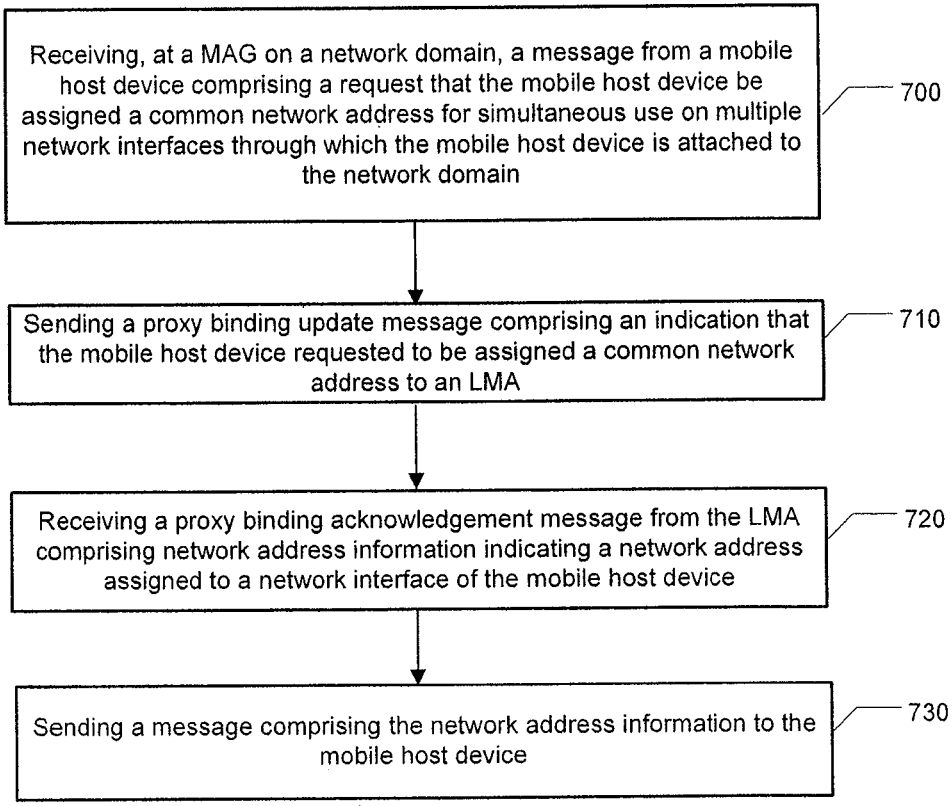

FIG. 5 is signaling diagram illustrating messages that may be exchanged between a mobile host device and a network domain according to an exemplary embodiment of the present invention; and FIGS. 6-7 are flowcharts according to an exemplary method for enabling assignment of a common network address to multiple network interfaces of a computing device attached to a network domain according to an exemplary embodiment of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

A network domain may comprise a local mobility anchor (LMA) and one or more mobility access gateways (MAG) in communication with the LMA. Each of the LMA and the MAG may be embodied as a single computing device or a plurality of computing devices operatively coupled to provide the functionality of an LMA and/or a MAG. Further, in some embodiments, an LMA and a MAG may be embodied on the same computing device. The LMA is responsible for assigning a mobile host device a network address when a mobile host device attaches to the network domain through a network interface of the mobile host device by establishing a data link with a MAG. A MAG provides network access to the network domain and serves as an intermediary between the mobile host device and the LMA. A MAG may provide network access, such as a radio access network, through any network access means or protocol, including, for example, cellular access (e.g., Third Generation Partnership Project (3GPP) wireless access protocols; 3G wireless access protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like; 3.9G wireless access protocols such as Long Term Evolution (LTE) or Evolved Universal Terrestrial Radio Access Network (E-UTRAN) and/or the like), WiFi access (e.g., a wireless local area network (WLAN)), Worldwide Interoperability for Microwave Access (WiMax), and/or the like.

A mobile host device may comprise a network interface which may be embodied in hardware, software, firmware, or some combination thereof and thus may comprise a physical hardware interface or a virtual software interface. A network interface may be configured to provide access to a wireline network connection, wireless network connection, or some combination thereof that is provided by a MAG.

A network interface may be configured to transmit and receive a data flow established with one or more devices. A data flow may comprise an IP flow. Example IP flows include hypertext transfer protocol (HTTP) data flows, voice over IP (VoIP) data flows, file transfer protocol (FTP) data flows, and/or the like. A data flow may also be referred to as a "data session" or "IP data session."

A "network address" may refer to a logical network layer address uniquely identifying a computing device, such as a mobile host device, on a network domain that may be used to send data to and/or receive data from the computing device over the network domain. From time to time, an Internet Protocol (IP) address will be used as an example of a network address. It will be appreciated, however, that where the term IP address is used, it is used merely for purposes of providing an illustrative example and accordingly other types of network addresses may be substituted within the scope of the invention.

Figure 1:
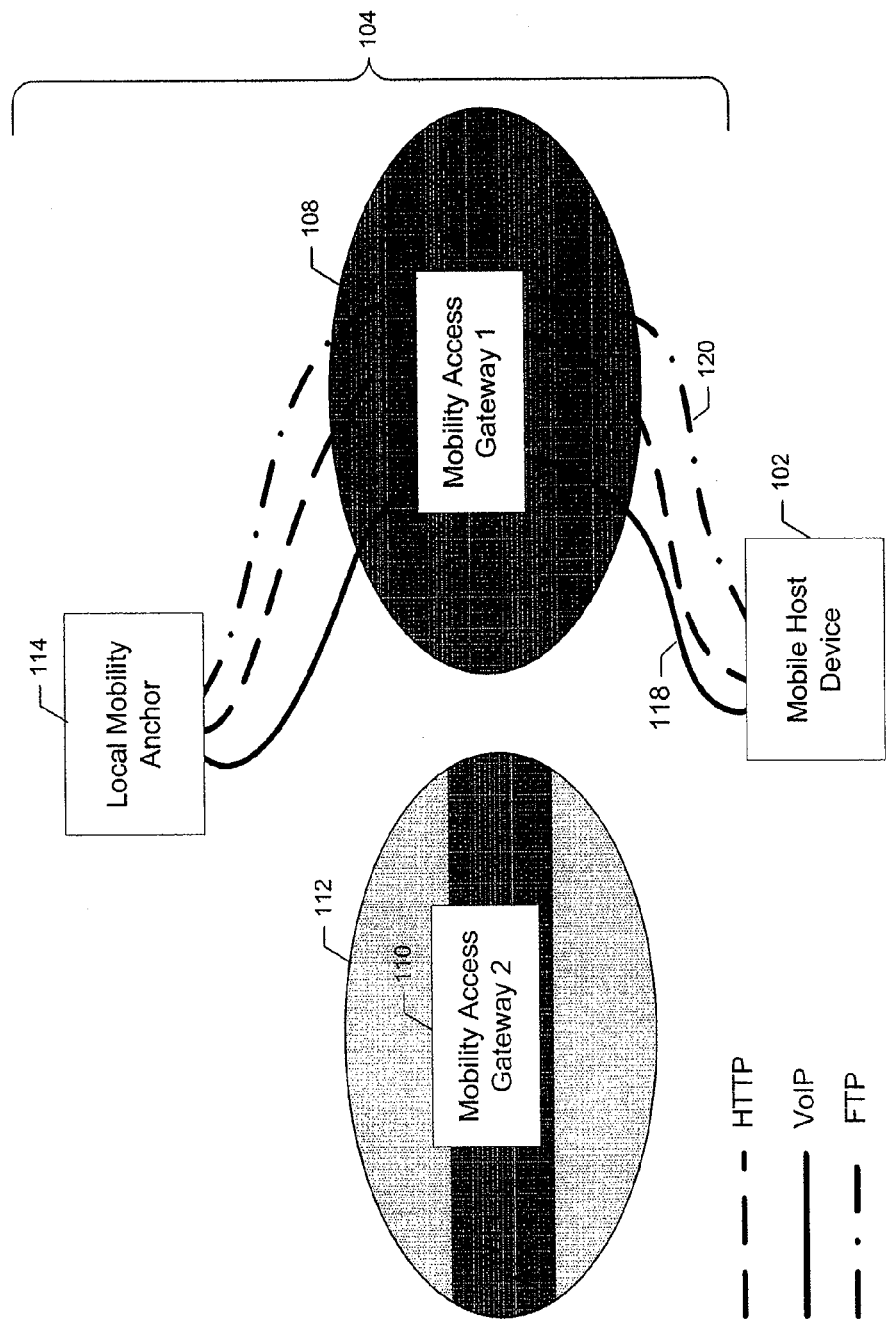
FIGS. 1 and 2 illustrate a computing device with multiple network interfaces and a problem that may be solved by embodiments of the present invention.
Figure 2:
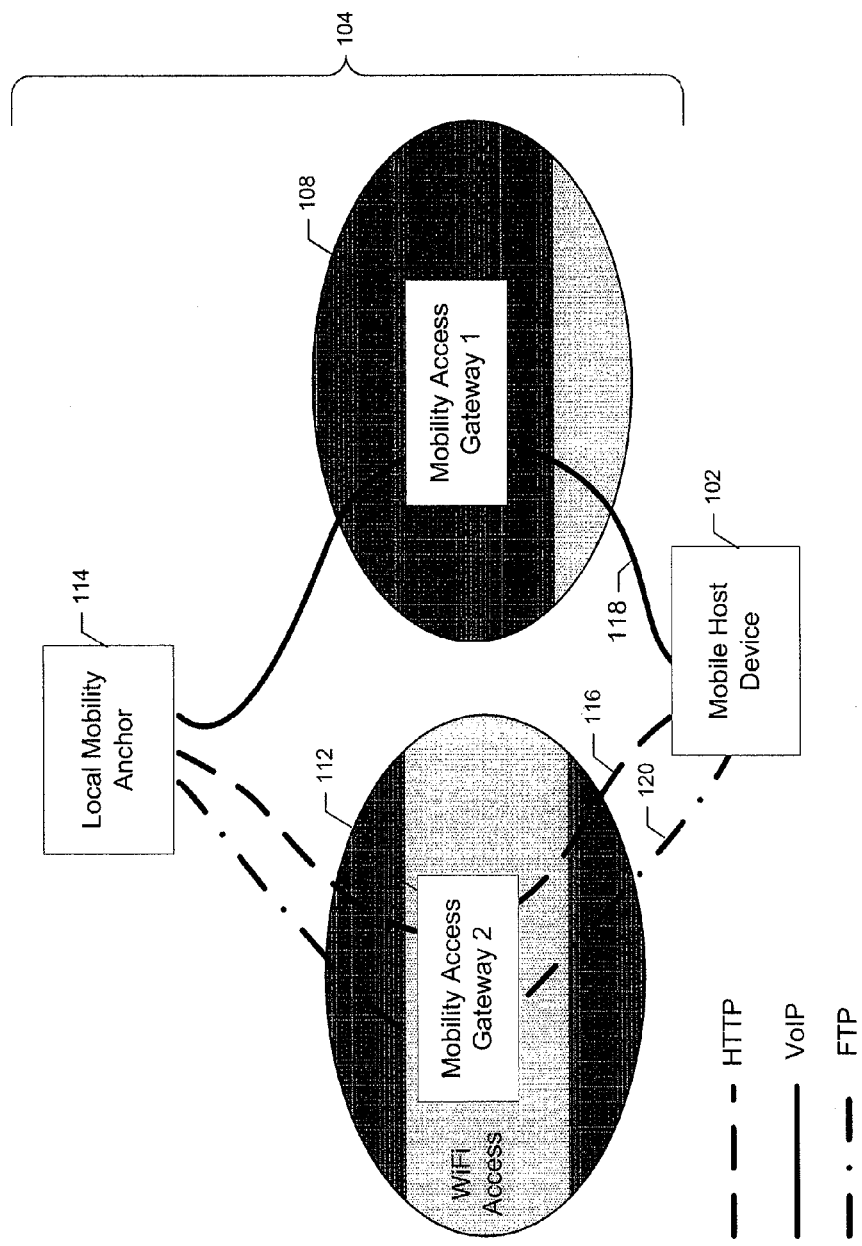

Referring now to FIGS. 1 and 2, which are illustrative of a problem that may be solved by embodiments of the present invention, FIGS. 1 and 2 illustrate a mobile host device 102 with multiple network interfaces, including a cellular network interface and a WiFi network interface, that is attached to a network domain 104 via at least one network interface of the mobile host device 102. The network domain 104 comprises a first MAG 106 providing access to the network domain 104 via a cellular access network 108, a second MAG 110 providing access to the network domain via a WiFi access network 112, and an LMA 114. In FIG. 1, the mobile host device 102 has attached to the network domain 104 via the first MAG 106 through a cellular network interface and has established three data flows—an HTTP data flow 116, a VoIP data flow 118, and an FTP data flow 120. The mobile host device 102 is either not in range of the WiFi access network 112 or has not attached to the network domain 104 through the second MAG 110 via the mobile host device's WiFi network interface.

Referring now to FIG. 2, the mobile host device 102 has now attached to the network domain 104 through the second MAG 110 and is thus attached to the network domain 104 through two network interfaces. In an exemplary embodiment the mobile host device 102 may move one or more data flows from the cellular network interface to the WiFi network interface through the second MAG 110. The WiFi access 112 may, for example, offer faster and/or cheaper network access than the cellular access 108. The mobile host device 102 may also maintain at least one data flow on the cellular network interface. For example, the VoIP data flow 118 may require a quality of service standard that is supported by the cellular access network 108, but not by the WiFi access network 112.

If the LMA had assigned the mobile host device 102 the same network address for both the cellular network interface and for the WiFi network interface, the mobile host device 102 might be able to easily move data flows between the network interfaces. However, existing standards for network domains providing network based mobility (e.g., the Proxy Mobile IPv6 (RFC 5213) specification) do not allow a mobile host device attached to a network domain to use multiple network interfaces at the same time with a common network address. In fact, RFC 5213 mandates that if a mobile host device 102 is attached to a netlmm domain through multiple network interfaces, each network interface must be configured with a unique network address that is based on a different home network prefix (HNP). Thus, existing network domains prevent the movement of data flow between network interfaces, as moving a data flow requires that the same network address that was used on the previous network interface is also valid for the network interface to which the data flow is moved.

Figure 3:
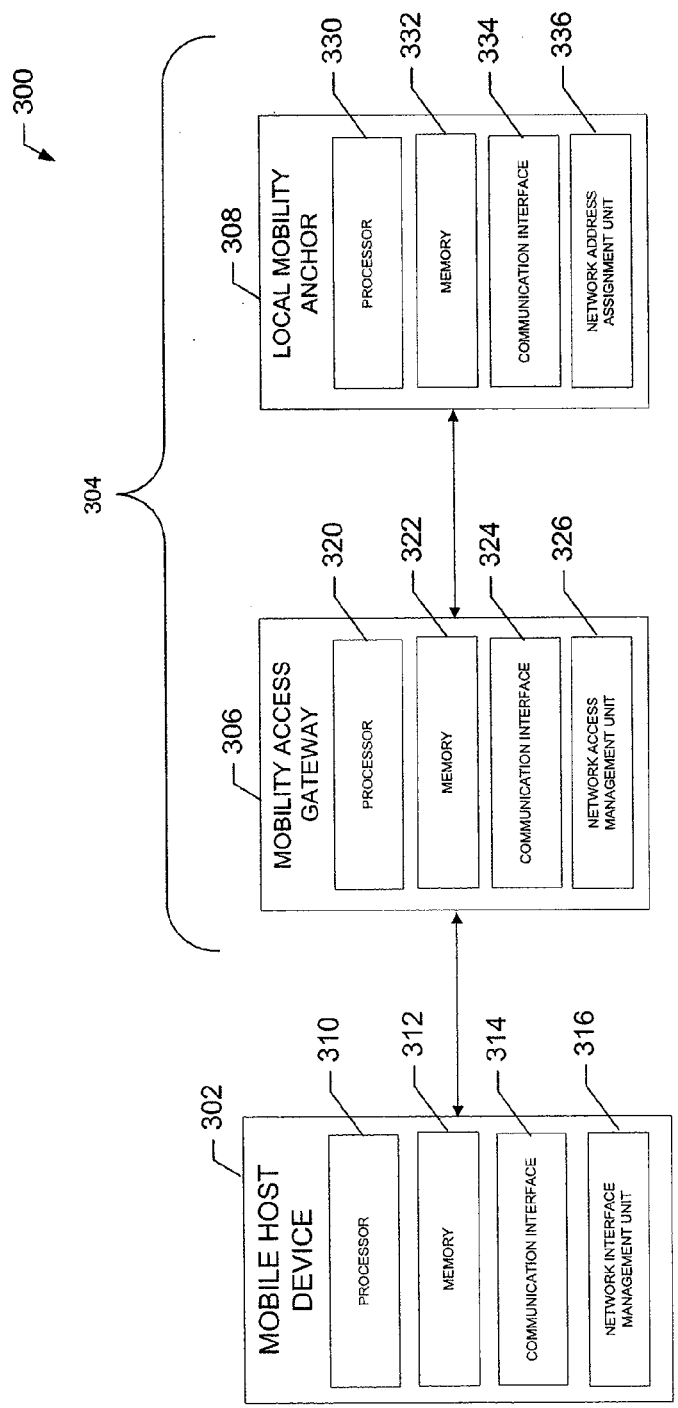
FIG. 3 illustrates a system for enabling assignment of a common network address to multiple network interfaces of a computing device attached to a network domain according to an exemplary embodiment of the present invention.

The problem illustrated in FIGS. 1 and 2 may be addressed by the system of FIG. 3, which illustrates a block diagram of a system 300 for enabling assignment of a common network address to multiple network interfaces of a computing device attached to a network domain according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 3 illustrates one example of a configuration of a system for enabling assignment of a common network address to multiple network interfaces of a computing device attached to a network domain, numerous other configurations may also be used to implement embodiments of the present invention.

Referring now to FIG. 3, in at least some embodiments, the system 300 includes a mobile host device 302 configured to attach through one or more network interfaces of the mobile host device 302 to a network domain 304. The network domain 304 comprises one or more mobility access gateways 306 and a local mobility anchor 308. The mobile host device 302 may be embodied as a server, desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. In an exemplary embodiment, the mobile host device 302 is embodied as a mobile terminal, such as that illustrated in FIG. 4.

Figure 4:
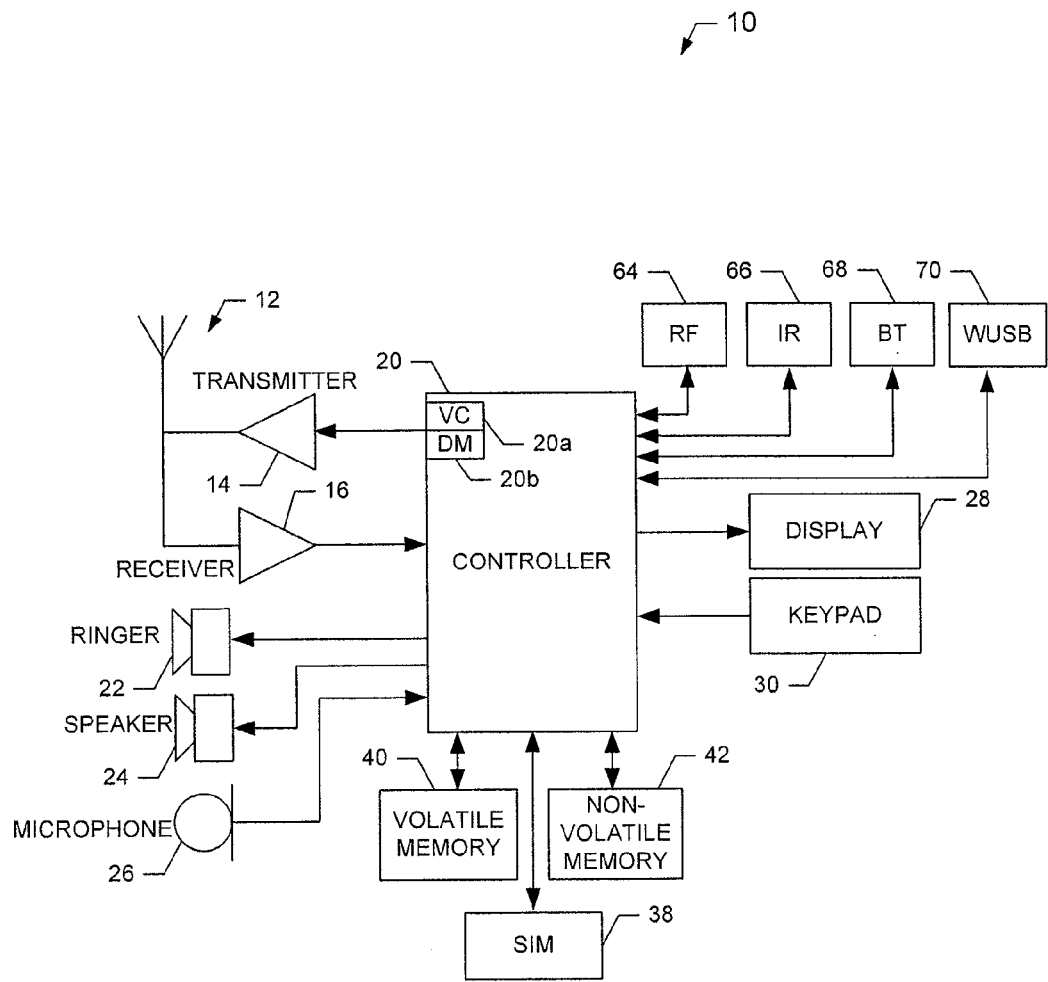
FIG. 4 is a schematic block diagram of a mobile terminal according to an exemplary embodiment of the present invention.

In this regard, FIG. 4 illustrates a block diagram of a mobile terminal 10 representative of one embodiment of a mobile host device 302 in accordance with embodiments of the present invention. It should be understood, however, that the mobile terminal 10 illustrated and hereinafter described is merely illustrative of one type of mobile host device 302 that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or WiMAX protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 10 may include a positioning sensor (not shown.) The positioning sensor may include, for example, a global positioning system (GPS) sensor, an assisted global positioning system (Assisted-GPS) sensor, etc. In one embodiment, however, the positioning sensor may include a pedometer or inertial sensor. In some embodiments, the positioning sensor is additionally or alternatively configured to determine a location of the mobile terminal using short-range radio signals, such as, for example, WLAN signals, Blue Tooth signals, and/or the like. Further, the positioning sensor may determine the location of the mobile terminal based upon signal triangulation or other mechanisms. The positioning sensor may be configured to determine a location of the mobile terminal, such as latitude and longitude coordinates of the mobile terminal or a position relative to a reference point such as a destination or a start point. Information from the positioning sensor may be communicated to a memory of the mobile terminal or to another memory device to be stored as a position history or location information. Furthermore, a memory of the mobile terminal may store instructions for determining cell id information. In this regard, the memory may store an application program for execution by the controller 20, which may determine an identity of the current cell, i.e., cell id identity or cell id information, with which the mobile terminal is in communication. In conjunction with the positioning sensor, the cell id information may be configured to more accurately determine a location of the mobile terminal.

As shown in FIG. 4, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 3, it will be appreciated that although only a single MAG 306 is illustrated, the network domain 304 may comprise a plurality of MAGs 306 and the mobile host device 302 may attach to the network domain through multiple MAGs 306 using multiple network interfaces of the mobile host device 302. Further, each MAG 306 may provide more than one network access. In this regard, a single MAG 306 may provide, for example, a cellular access network and a WiFi access network to which the mobile host device 302 may attach. Further, although illustrated in FIG. 3 as separate devices, a MAG 306 and LMA 308 may be embodied on a single computing device.

In an exemplary embodiment, the mobile host device 302 includes various means, such as a processor 310, memory 312, communication interface 314, and network interface management unit 316 for performing the various functions herein described. These means of the mobile host device 302 as described herein may be embodied as, for example, hardware elements (e.g., a suitably programmed processor, combinational logic circuit, and/or the like), computer code (e.g., software or firmware) embodied on a computer-readable medium (e.g. memory 312) that is executable by a suitably configured processing device (e.g., the processor 310), or some combination thereof. The processor 310 may, for example, be embodied as various means including a microprocessor, a coprocessor, a controller, or various other processing elements including integrated circuits such as, for example, an ASIC (application specific integrated circuit) or FPGA (field programmable gate array). In embodiments wherein the mobile host device 302 is embodied as a mobile terminal 10, the processor 310 may be embodied as or otherwise comprise the controller 20. In an exemplary embodiment, the processor 310 is configured to execute instructions stored in the memory 312 or otherwise accessible to the processor 310. Although illustrated in FIG. 3 as a single processor, in some embodiments the processor 310 comprises a plurality of processors.

The memory 312 may include, for example, volatile and/or non-volatile memory. The memory 312 may be configured to store information, data, applications, instructions, or the like for enabling the mobile host device 302 to carry out various functions in accordance with exemplary embodiments of the present invention. For example, in at least some embodiments, the memory 312 is configured to buffer input data for processing by the processor 310. Additionally or alternatively, in at least some embodiments, the memory 312 is configured to store program instructions for execution by the processor 310. The memory 312 may comprise one or more databases that store information in the form of static and/or dynamic information. This stored information may be stored and/or used by the network interface management unit 316 during the course of performing its functionalities.

The communication interface 314 may be embodied as any device or means embodied in hardware, software, firmware, or a combination thereof that is configured to receive and/or transmit data from/to a remote device, such as a MAG 306. In this regard, in at least one embodiment, the communication interface 314 comprises one or more network interfaces. In at least one embodiment, the communication interface 314 is at least partially embodied as or otherwise controlled by the processor 310. The communication interface 314 may include, for example, an antenna, a transmitter, a receiver, a transceiver and/or supporting hardware or software for enabling communications with other entities of the system 300. The communication interface 314 may be configured to receive and/or transmit data using any protocol that may be used for communications between computing devices of the system 300. The communication interface 314 may additionally be in communication with the memory 312 and/or network interface management unit 316, such as via a bus.

The network interface management unit 316 may be embodied as various means, such as hardware, software, firmware, or some combination thereof and, in one embodiment, is embodied as or otherwise controlled by the processor 310. In embodiments where the network interface management unit 316 is embodied separately from the processor 310, the network interface management unit 316 may be in communication with the processor 310. In some embodiments, the network interface management unit 316 comprises one or more network interfaces and may accordingly be embodied as a portion of the communication interface 314. The network interface management unit 316 is configured in at least some embodiments to manage attachment of network interfaces of the mobile host device 302 to the network domain 304 and/or to manage moving data flows between network interfaces as will be described further herein.

Referring now to the MAG 306, embodiments of the MAG 306 include various means, such as a processor 320, memory 322, communication interface 324, and network access management unit 326 for performing the various functions herein described. These means of the MAG 306 as described herein may be embodied as, for example, hardware elements (e.g., a suitably programmed processor, combinational logic circuit, and/or the like), computer code (e.g., software or firmware) embodied on a computer-readable medium (e.g. memory 322) that is executable by a suitably configured processing device (e.g., the processor 320), or some combination thereof. The processor 320 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 320 is configured to execute instructions stored in the memory 322 or otherwise accessible to the processor 320. Although illustrated in FIG. 3 as a single processor, in some embodiments, the processor 320 comprises a plurality of processors, which may operate cooperatively, such as in parallel. In embodiments wherein the processor 320 is embodied as a plurality of processors, the plurality of processors may be embodied in a single computing device or in a plurality of computing devices operating cooperatively to implement the MAG 306.

The memory 322 may include, for example, volatile and/or non-volatile memory. The memory 322 may be configured to store information, data, applications, instructions, or the like. For example, in at least some embodiments, the memory 322 is configured to buffer input data for processing by the processor 320. Additionally or alternatively, the memory 322 is configured in at least some embodiments to store program instructions for execution by the processor 320. The memory 322 may comprise one or more databases that store information in the form of static and/or dynamic information. This stored information may be stored and/or used by the network access management unit 326 during the course of performing its functionalities.

The communication interface 324 may be embodied as any device or means embodied in hardware, software, firmware, or a combination thereof that is configured to receive and/or transmit data from/to a remote device, such as a mobile host device 302 and/or LMA 308. In one embodiment, the communication interface 324 is at least partially embodied as or otherwise controlled by the processor 320. The communication interface 324 may include, for example, an antenna, a transmitter, a receiver, a transceiver and/or supporting hardware or software for enabling communications with other entities of the system 300. The communication interface 324 may be configured to receive and/or transmit data using any protocol that may be used for communications between computing devices of the system 300. The communication interface 324 may additionally be in communication with the memory 322 and/or network access management unit 326, such as via a bus.

The network access management unit 326 may be embodied as various means, such as hardware, software, firmware, or some combination thereof and, in one embodiment, is embodied as or otherwise controlled by the processor 320. In embodiments wherein the network access management unit 326 is embodied separately from the processor 320, the network access management unit 326 may be in communication with the processor 320. The network access management unit 326 is configured in at least some embodiments to serve as an intermediary between the mobile host device 302 and LMA 308 and may, for example, facilitate attachment of an interface of the mobile host device 302 to the network domain 304 and/or facilitate movement of a data flow between interfaces of the mobile host device 302 that are attached to the network domain 304.

Referring now to the LMA 308, embodiments of the LMA 308 include various means, such as a processor 330, memory 332, communication interface 334, and network address assignment unit 336 for performing the various functions herein described. These means of the LMA 308 as described herein may be embodied as, for example, hardware elements (e.g., a suitably programmed processor, combinational logic circuit, and/or the like), computer code (e.g., software or firmware) embodied on a computer-readable medium (e.g. memory 332) that is executable by a suitably configured processing device (e.g., the processor 330), or some combination thereof. The processor 330 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 330 is configured to execute instructions stored in the memory 332 or otherwise accessible to the processor 330. Although illustrated in FIG. 3 as a single processor, in some embodiments, the processor 330 comprises a plurality of processors, which may operate cooperatively, such as in parallel. In embodiments wherein the processor 330 is embodied as a plurality of processors, the plurality of processors may be embodied in a single computing device or in a plurality of computing devices operating cooperatively to implement the LMA 308.

The memory 332 may include, for example, volatile and/or non-volatile memory. The memory 332 may be configured to store information, data, applications, instructions, or the like. For example, in at least some embodiments, the memory 332 is configured to buffer input data for processing by the processor 330. Additionally or alternatively, the memory 332 is configured in at least some embodiments to store program instructions for execution by the processor 330. The memory 332 may comprise one or more databases that store information in the form of static and/or dynamic information. For example, the memory 332 may store network address information indicating network addresses assigned by the LMA 308 to one or more mobile host devices 302 attached to the network domain 304. This stored information may be stored and/or used by the network address assignment unit 334 during the course of performing its functionalities.

The communication interface 334 may be embodied as any device or means embodied in hardware, software, firmware, or a combination thereof that is configured to receive and/or transmit data from/to a remote device, such as a MAG 306. In one embodiment, the communication interface 334 is at least partially embodied as or otherwise controlled by the processor 330. The communication interface 334 may include, for example, an antenna, a transmitter, a receiver, a transceiver and/or supporting hardware or software for enabling communications with other entities of the system 300. The communication interface 334 may be configured to receive and/or transmit data using any protocol that may be used for communications between computing devices of the system 300. The communication interface 334 may additionally be in communication with the memory 332 and/or network address assignment unit 336, such as via a bus.

The network address assignment unit 336 may be embodied as various means, such as hardware, software, firmware, or some combination thereof and, in one embodiment, is embodied as or otherwise controlled by the processor 330. In embodiments wherein the network address assignment unit 336 is embodied separately from the processor 330, the network address assignment unit 336 may be in communication with the processor 330. The network address assignment unit 336 is configured in at least some embodiments to assign a network address to a network interface of the mobile host device 302 through which the mobile host device 302 is attached and/or through which the mobile host device 302 is requesting to establish a data link to the network domain 304 through a MAG 306. The network address assignment unit 336 is further configured in at least some embodiments to control movement of existing data flows between network interfaces of the mobile host device 302 by granting a request received from a mobile host device 302 and/or by sending a command instructing the mobile host device 302 to move an existing data flow to another network interface.

In an exemplary embodiment, the network interface management unit 316 of a mobile host device 302 is configured to send a message to a MAG 306 comprising an indication of a request that the mobile host device 302 be assigned a common network address for simultaneous use on multiple network interfaces of the mobile host device 302 through which the mobile host device 302 is attached to the network domain 304. In this regard, the network interface management unit 316 may indicate that the mobile host device 302 is to be multihomed and use the same IP address on multiple interfaces.

In at least some embodiments of the invention, the network interface management unit 316 may be configured to include the indication that the mobile host device 302 is to be multihomed and use the same IP address on multiple interfaces as an internet control message protocol (ICMP) option in the message sent to the MAG 306. This ICMP option may be used in embodiments wherein the mobile host device 302 and MAG 306 are configured to communicate in accordance with IP version 6. In an exemplary embodiment, the ICMP option may be formatted in accordance with the following example specification:

Address Hint ICMP Option:

it would prefer to use for network address configuration on the interface over which the network interface management unit 316 sends the message to the MAG 316 as a hint in the Prefix field. The network interface management unit 316 may be configured to use the link-local address of the mobile host device 302 as the source address for the message.

In embodiments wherein the mobile host device 302 and MAG 306 are configured to communicate with each other in accordance with IP version 4, the network interface management unit 316 may be configured to include a dynamic host configuration protocol (DHCP) version 4 option in a message sent to the MAG 306 as an indication that the mobile host device 302 would like to be assigned a common network address for simultaneous use on multiple network interfaces of the mobile host device 302. In an exemplary embodiment, the DHCPv4 option is formatted as follows:

Access Hint Option

The code for this option is to be assigned according to the IETF process, and the length of the option is 1.

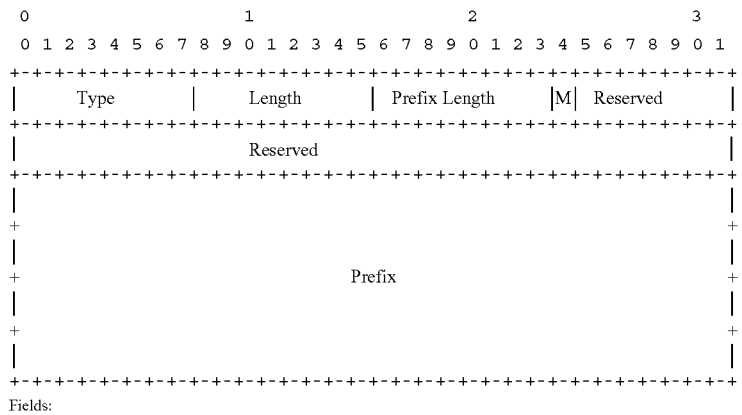

Fields:

Type          to be assigned

Length        1 if the Prefix is not included, 3 otherwise.

Prefix Length set to the length of the significant prefix bits
              included in the Prefix field. If the Prefix
              field is not included, this field is set to 0 by
              sender and ignored by the receiver.

Reserved      This field is unused. It MUST be initialized to
              zero by the sender and MUST be ignored by the
              receiver.

M             1-bit flag. Set to 1 if the host wants to be
              multihomed.

Prefix        This filed contains a prefix that the host would
              like to use on this interface. This is taken
              only as a hint by the recipient of the message.

The network interface management unit 316 may be configured to include the ICMP option in a router solicitation message and/or in a data flow binding request message as will be described further below to indicate that the mobile host device would like to be assigned the same network address over multiple network interfaces. In an exemplary embodiment, the network interface management unit 316 is configured to set the M bit in the Address hint option to 1. The network interface management unit 316 may be further configured to include the network prefix or network address that

```
Code    Len    Value
+-----+-----+-----+
| tbd |  1  | 0/1 |
+-----+-----+-----+
```

This option specifies whether the mobile host device 302 would prefer to use the same network address across multiple network interfaces. A value of 0 means that the mobile host device 302 asks for a new address, and a value of 1 means that the mobile host device 302 has a valid address on another network interface and that it would like to use this network address also on the interface over which the DHCPv4 message is sent. If the value of this option is set to 1, the network interface management unit 316 may also include the Requested IP Address option [RFC2132] in the DHCP request and initialize it to the value of the IP address assigned to its other network interface that it would like to use also on this network interface.

The network access management unit 326 is configured to receive a message according to any of the formats described above, such as a router solicitation message or data flow binding request message, sent by the mobile host device 302 requesting that the mobile host device 302 be assigned a common network address for simultaneous use on multiple network interfaces of the mobile host device 302 through which the mobile host device 302 is attached to the network domain 304. The received message may include an indication in accordance with any of the formats previously discussed that may be used in IPv4, IPv6, and/or other implementations of embodiments of the present invention.

In response to receipt of a message indicating a request that the mobile host device 302 be assigned a common network address, the network access management unit 326 is configured to send a message comprising an indication that the mobile host device 302 requested to be assigned a common network address for use on multiple network interfaces of the mobile host device 302. In an exemplary embodiment, this message comprises a proxy binding update message comprising an indication that the mobile host device 302 requested to be assigned a common network address for use on multiple network interfaces of the mobile host device 302. In this regard, the MAG 306 may inform the LMA 308 that the mobile host device 302 would like to use the same network address on multiple network interfaces so that the LMA 308 may allocate the same network address to multiple network interfaces through which the mobile host device 302 is attached to the network domain 304. In an exemplary embodiment, the indication included in the proxy binding update message comprises a newly specified value defined by the present invention that may be included in the Handoff indicator [RFC5213] option of the proxy binding update message. This newly specified value may be defined as the following option" "6: Multihoming using the same home network prefix."

The network address assignment unit 336 is configured to receive messages, including a proxy binding update message, sent by the MAG 306 to the LMA 308. In an exemplary embodiment, the network address assignment unit 336 is configured to create a new binding cache entry for the mobile host device 302 upon receipt of a proxy binding update message indicating that the mobile host device 302 requested to be assigned a common network address for use on multiple network interfaces of the mobile host device 302. The network address assignment unit 336 may store this new binding cache entry in the memory 332. The network address assignment unit 336 may then determine whether there is a pre-existing binding cache entry for the mobile host device 302 stored in the memory 332. If there is a pre-existing binding cache entry for the mobile host device 302, the network address assignment unit 336 may be configured to copy network address information from the pre-existing binding cache entry to the new binding cache entry. This network address information may comprise a home network prefix associated with the mobile host device that is used by the LMA 308 and/or the mobile host device 302 to determine a network address for the mobile host device 302. When there is not a pre-existing binding cache entry for the mobile host device 302, the network address assignment unit 336 may be configured to assign a new network address and/or a new home network prefix to the mobile host device 302 and store network address information (e.g., a home network prefix) indicating a new network address to the new binding cache entry. The network address assignment unit 336 is then configured to send a message to the MAG 306 comprising the network address information stored in the new binding cache entry for the mobile host device. This message comprises a proxy binding acknowledgement message in an exemplary embodiment of the present invention. In this regard, the network address assignment unit 336 may be configured to set the Home network prefix option of the proxy binding acknowledgement message to the value of the home network prefix stored in the new binding cache entry.

In at least some embodiments, the network access management unit 326 is configured to receive a message, such as a proxy binding acknowledgement message, comprising network address information stored in the new binding cache entry, sent by the LMA 308. Upon receipt of the message, the network access management unit 326 may be configured to extract the network address information and may then send a message comprising the extracted network address information to the mobile host device 302. This message sent by the network access management unit 326 may comprise, for example, a router advertisement message comprising the extracted network address information.

In embodiments wherein the mobility access gateway 306 and mobile host device 302 are configured to communicate using IPv4 and the MAG 306 initially received a message including a DHCPv4 access hint option prompting the network access management unit 326 to send a proxy binding update message to the LMA 308, the network access management unit 326 may be configured to include an access hint option with a value of 1 if the network domain 304 is able to support allocating the same network address across multiple network interfaces of the mobile host device 302. If the network domain 304 is not able to support allocation of a common network address, the network access management unit 326 may be configured to include an access hint option with a value of 0 in a response message sent to the mobile host device 302.

The network interface management unit 316 is configured to receive a message sent by the MAG 306 that includes network address information and/or an indication of whether the network domain 304 is configured to support assignment of a common network address to multiple network interfaces of the mobile host device 302. The network interface management unit 316 may be configured to determine, as necessary, the network address assigned to the interface of the mobile host device 302 by the LMA 308 based at least in part upon the contents of the received message.

The network interface management unit 316 and/or the network address assignment unit 336 may be configured to determine which network interface to use for a data flow when the new data flow is established, when the mobile host device 302 attaches to the network domain 304 through an additional network interface, and/or when a network interface of the mobile host device 302 that was previously attached to the network domain 304 is detached, such as due to loss of radio signal. In this regard, for example, the mobile host device 302 (e.g., the network interface management unit 316) and/or the LMA 308 (e.g., the network address assignment unit 336) may be configured to determine which network interface is to be used for a data flow by starting to send packets or other data of the data flow via the corresponding network interface. The remote node of the data flow (e.g., whichever of the mobile host device 302 or LMA 308 that did not initiate sending data to the other to establish the data flow or to move the data flow to a newly available) will then notice what is happening and follow by also using the selected interface for data belonging to the same data flow. Additionally or alternatively, the network interface management unit 316 and/or the network address assignment unit 336 may be configured to enforce preconfigured policies defining which network interface a type of data flow should be transmitted over. In this regard, the network interface management unit 316 is aware of the available network interfaces on the mobile host device 302 and the network address assignment unit 336 may learn the same information from Access technology type option [RFC5213] in the proxy binding update message. For example, a preconfigured policy may dictate that VoIP traffic always goes through the cellular interface while FTP and web browsing data flows go through the IEEE 802.11 or other WiFi network interface. If there is a preconfigured policy that the FTP traffic should go over the 802.11 interface, then as soon as the mobile host device 302 gains connectivity via its 802.11 interface attaching to the network domain 304, any existing FTP flows that were using other interface shall be delivered via 802.11 interface. These preconfigured policies may be statically configured or may be periodically updated, such as by a user of the mobile host device 302 and/or an operator of the network domain 304.

In at least some embodiments, the mobile host device 302 and network domain 304 are configured to dynamically negotiate which network interface a type of data flow is to be sent over. In this regard, the network interface management unit 316 and/or an element of the network domain 304 (e.g., the network access management unit 326 and/or network address assignment unit 336) may be configured to exchange messages to dynamically negotiate network interface policies. A data flow binding request message in accordance with embodiments of the present invention comprises an indication of an existing data flow between the mobile host device 302 and the network domain 304. The data flow binding request message further indicates a preferred network interface to be used for the data flow. The indication of a preferred network interface may be explicitly indicated as an option value or other parameter included in the data flow binding request message. Additionally or alternatively, the indication of a preferred network interface may be implicitly indicated in that the network interface of the mobile host device 302 used by the network interface management unit 316 to send the data flow binding request message and/or the network interface to which the network domain 304 (e.g., the network access management unit 326 of the MAG 306) sends the data flow binding request message is implicitly indicated as the preferred network interface. In response to receipt of a data flow binding request message, an entity of the network domain 304 (e.g., the network access management unit 326) and/or the mobile host device 302 (e.g., the network interface management unit 316) may send a data flow binding response message confirming or denying the request.

Thus, for example, when the mobile host device 302 wants to instruct the network domain 304 to deliver a particular data flow over a particular network interface, the network interface management unit 316 may send a data flow binding request message to a MAG 306. The MAG 306 to which the data flow binding request message is sent may correspond to the MAG 306 to which the network interface to which the mobile host device 302 wants the particular data flow delivered is attached. Similarly, when an element of the network domain 304 wants to instruct the mobile host device 302 that a data flow is to be moved to a particular network interface, the network access management unit 326 may be configured to send a data flow binding request message to the mobile host device 302. The network access management unit 326 may be configured to send the data flow binding request message at the behest of the LMA 308. In this regard, the network address assignment unit 336 may be configured to assign data flows to specific network interfaces and instruct attached mobile host devices 302 accordingly.

In an exemplary embodiment, the data flow binding request message and data flow binding response message may comprise specially configured ICMP message used for dynamic negotiation of network interface policies. These ICMP messages may take the format of the following example "IP flow binding request message" and "IP flow binding response message":

IP Flow Binding Request Message:

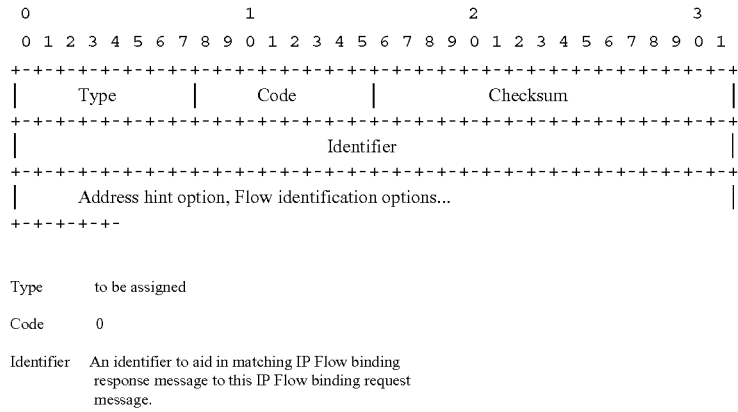

The IP flow binding response message may optionally include exactly one Address hint option and zero or more Data Flow Identification options. A data flow identification option identifies a particular data flow (e.g., the data flow to be delivered over a particular network interface). At least one of the options must be present in the message. It may also include the Source/target link layer address option [RFC4861] set to the link layer address of the interface from which the message is sent.

IP Flow Binding Response Message:

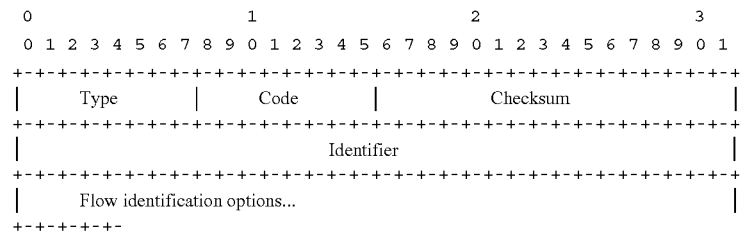

```
Type        to be assigned

Code        0

Identifier  The identifier from the invoking IP Flow binding
request     message.
```

Flow identification options Zero or more data flow identification options.

In an exemplary embodiment, the data flow identification option included in the IP Flow binding request and IP Flow binding response messages is formatted in accordance with standards for a "flow identification option" as set forth in the document "Flow Bindings in Mobile IPv6 and Nemo Basic Support", May 2008, draft-ietf-mext-flow-binding-00; H. Soliman, N. Montavont, N. Fikouras, and K. Kuladinithi.

A data flow binding request message may be sent any time to either move an existing data flow to another network interface or to install a rule indicating which network interface should be used for a new (not yet established) data flow.

When the MAG 306 receives a data flow binding request message from the mobile host device 302, the network access management unit 326 is configured to extract a data flow identification option and include the extracted data flow identification option in a proxy binding update message sent to the LMA 308. When the LMA 308 receives a proxy binding update message including a data flow identification option, the network address assignment unit 336 is configured to associate the data flow identified in the proxy binding update message with the binding cache entry indicated by the received proxy binding update message. The network address assignment unit may respond by sending a public binding acknowledgement (PBack) message comprising the data flow identification option with an appropriate status code to the MAG 306. The network access management unit 326 is configured to then copy the data flow identification option from the received public binding acknowledgement message into a data flow binding response message and send the data flow binding response message to the mobile host device 302.

When downlink traffic of a data flow for the mobile host device 302 arrives at the LMA 308, the network address assignment unit 336 is configured to apply preconfigured policies and/or dynamically negotiated network interface preferences to locate an appropriate binding cache entry from the memory 332 associated with the type of data flow to forward the traffic to the appropriate MAG 306 based on the network interface rule. Similarly, when the mobile host device 302 has data to send, the network interface management unit 316 is configured to apply preconfigured policies and/or dynamically negotiated network interface preferences to select the network interface over which the data is to be delivered to the network domain 304.

In embodiments wherein the MAG 306 supports multiple types of network interface access technologies (e.g., cellular network access and WiFi network access), the MAG 306 is the forking point for downlink traffic rather than the LMA 308. Accordingly, in such embodiments, the network access management unit 326 may not forward a data flow identification option to the LMA 308 in a proxy binding update message and may instead locally process the data flow identification option received from the mobile host device 302 and install an appropriate rule in a local routing table that may be stored in memory 322.

In some embodiments of the invention, a link layer approach may be used when it is not possible or is preferred not to modify a network protocol stack (e.g., an IP stack) embodied on the mobile host device 302. Accordingly, in some embodiments, wherein the IP layer of the mobile host device 302 is not modified, an intermediate layer between mobile host device 302's IP stack and the physical network interfaces is implemented. The intermediate layer hides the physical network interfaces from the IP stack and provides the IP stack with a single virtual interface. The mobile host device 302's network address is assigned to the virtual interface. The virtual interface manages the physical interfaces. Any packets or other data received over a physical network interface are delivered to the virtual interface, which in turn takes care of the delivery of the packet to the mobile host device 302's IP stack. Any data sent by the mobile host device 302's IP stack is intercepted by the virtual interface, which forwards them to the appropriate physical network interface for the delivery to the network domain 304. In such embodiments, the link layer signaling between the physical network interfaces of the mobile host device 302 and the network domain 304 may be enhanced so that it can carry an indication to the MAG 306 if multihoming with the same network address across multiple physical network interfaces is desired by the mobile host device 302. The virtual interface may accordingly instruct a physical network interface if and when such an indication should be sent to the network domain 304. The actions taken by the network access management unit 326 of the MAG 308 in the response to receiving such an indication through link layer signaling are the same as when the MAG 306 receives an Access Hint option as described above.

The virtual interface may be configured to use predefined policies and/or learn-by-observe method to decide which physical network interface a data flow should be delivered over. In some link layer technologies, it may even be possible that the link layer provides the mechanism to dynamically negotiate which data flows go over a particular network interface. In such case the virtual interface may make use of such capabilities to dynamically negotiate with the network domain transparently to the host's IP stack.

FIG. 5 is a signaling diagram illustrating messages that may be exchanged between a mobile host device and a network domain according to an exemplary embodiment of the present invention. In this regard, FIG. 5 illustrates messages that may be exchanged between a mobile host device 302 and a network domain 304 comprising two MAGs—MAG 1 306 (a) and MAG 2 306(b)—and an LMA and implementing proxy mobile IP 6 (PMIP6) in accordance with an exemplary embodiment of the present invention.

Operation 500 comprises an initial state wherein the mobile host device 302 has established a first data link with MAG 1 over a first network interface of the mobile host device 302 and the MAG 1 has established a PMIP6 tunnel to the LMA. The LMA has assigned to the mobile host device 302 the home network prefix HNP1 and this is the prefix used by the mobile host device 302 on the data link to the MAG 1.

At operation 505, the mobile host device 302 establishes a second data link with the MAG 2 via a second network interface of the mobile host device 302. Upon establishment of the link layer, the network interface management unit 316 may send a data flow binding request message to the MAG 2 with the Address hint option containing the prefix HNP1 and the M bit set to indicate that the mobile host device 302 would like to be assigned a common network address for use on both the first and second network interfaces, at operation 510.

At operation 515, receipt of the data flow binding request message triggers the network access management unit 326 of the MAG 2 to send a proxy binding update message. Based on the value of the M flag in the data flow binding request message, the network access management unit 326 sets the Handoff indicator in the proxy binding update message to the value "6: Multihoming using the same home network prefix". The network access management unit 326 may also include the home network prefix (HNP1) received in the Address hint option in the Home network prefix option of the proxy binding update message. The network access management unit 326 may use the Source/Target link layer address option from the data flow binding request message to populate the Mobile Node Link-layer Identifier option in the proxy binding update message.

The network access management unit 326 of the MAG 2 sends an empty data flow binding response message to the mobile host device 302 to acknowledge the receipt of the corresponding data flow binding request message, at operation 520.

Operation 525 may comprise the network interface management unit 316 sending the Router Solicitation [RFC4861] message as part of the configuration process on the second data link. If the network interface management unit 316 had not sent the data flow binding request message with Address hint option at operation 510, the network interface management unit 316 may include the Address hint option in the Router Solicitation message.

Operation 530 comprises the network address assignment unit 336 of the LMA 308 responding with the proxy binding acknowledgement message comprising the network prefix HNP1 in the Home network prefix option [RFC5213]. This is the same network prefix that the mobile host device 302 is using on its link with MAG 1. The LMA 308 now has two binding cache entries for the mobile host device 302—one pointing to the MAG 1 and the other pointing to the MAG 2.

Operation 535 illustrates the PMIP6 tunnel between the MAG 2 and the LMA 308 that was successfully established by the previous operation and comprises the network access management unit 326 of the MAG 2 sending a Router Advertisement message to the mobile host device comprising the network prefix (HNP1) that was received in the PBAck message from the LMA 308. By receiving the same HNP1 over its second network interface, the mobile host device 302 is able to use the same network address (based on the HNP1) on both of its links.

Operation 540 may comprise the network interface management unit 316 sending a data flow binding request message comprising the data flow identification option. The data flow identification option describes a particular data flow (or set of data flows) which the network interface management unit 316 would like to be delivered over the interface through which the data flow binding request message was sent and/or over a network interface otherwise indicated in the data flow binding request message.

Operation 545 comprises the network access management unit 326 of the MAG 2 copying the data flow identification option from the data flow binding request message into a new proxy binding update message and sending the proxy binding update message to the LMA 308. The network address assignment unit 336 then extracts the data flow identification option from the proxy binding update message and installs a rule that any packets for the mobile host device 302 that match the data flow described by the data flow identification option shall be delivered to the proxy care-of address contained in the binding cache entry corresponding to the proxy binding update message.

Operation 550 comprises the network address assignment unit 336 acknowledging that it accepted and installed the appropriate routing rule for the requested data flow(s) and that any packets or other data matching the data flow description may be delivered accordingly. The network address assignment unit 336 may further include the data flow identification option with the appropriate result code in the PBAck message.

Operation 555 comprises the network access management unit 326 of the MAG 2 copying the data flow identification option from the PBAck message into a data flow binding response message and sending the data flow binding response message to the mobile host device 302. The network interface management unit 316 may then complete the process of installing the routing rule for the desired data flow.

FIGS. 6-7 are flowcharts of systems, methods, and computer program products according to exemplary embodiments of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one exemplary method for enabling assignment of a common network address to multiple network interfaces of a computing device attached to a network domain according to an exemplary embodiment of the present invention is illustrated in FIG. 6. In this regard, FIG. 6 illustrates operations occurring at a mobile host device 302. Operation 600 comprises the network interface management unit 316 sending a message to a MAG 306 on a network domain 304 comprising a request that the mobile host device 302 be assigned a common network address for simultaneous use on multiple network interfaces through which the mobile host device 302 is attached to the network domain 304. This message may comprise, for example, a router solicitation message or a data flow binding request message including an option indicating the request. The method further includes the network interface management unit 316 receiving a message from the MAG 306 indicating that the mobile host device 302 has been assigned a common network address, at operation 610.

FIG. 7 illustrates a flowchart according to an exemplary method for enabling assignment of a common network address to multiple network interfaces of a computing device attached to a network domain according to an exemplary embodiment of the present invention. In this regard, FIG. 7 illustrates operations occurring at a MAG 306. The method includes the network access management unit 326 receiving a message from the mobile host device 302 comprising a request that the mobile host device 302 be assigned a common network address for simultaneous use on multiple network interfaces through which the mobile host device 302 is attached to the network domain 304, at operation 700. Operation 710 comprises the network access management unit 326 sending a proxy binding update message comprising an indication that the mobile host device 302 requested to be assigned a common network address to the LMA 308. The network access management unit 326 receives a proxy binding acknowledgement message from the LMA 308 comprising network address information (e.g., a network prefix for example) indicating a network address assigned to a network interface of the mobile host device 302, at operation 720. Operation 730 comprises the network access management unit 326 sending a message comprising the network address information to the mobile host device 302.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to a computing device having multiple network interfaces, such as a mobile terminal 10. Embodiments of the invention provide for assignment of a common network address to multiple network interfaces of a mobile host device on network domain, such as a network localized mobility management domain. Embodiments of the invention further enable movement of data flows, such as IP flows, between network interfaces of a mobile host device having a common network address. At least some embodiments of the invention allow dynamic negotiation of what network interface a type of data flow should be transmitted over.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, at a mobility access gateway on a network domain, a message comprising a request that a mobile host device be assigned a common network address for simultaneous use on multiple network interfaces of the mobile host device through which the mobile host device is attached to the network domain;

causing a proxy binding update message to be sent to a local mobility anchor, wherein the proxy binding update message comprises an indication that the mobile host device has been assigned a common network address for use on multiple network interfaces of the mobile host device; and causing a proxy binding acknowledgement message to be sent from the local mobility anchor to the mobility access gateway, wherein the proxy binding acknowledgement message comprises network address information indicating the network address assigned to the mobile host device.

2. A method according to claim 1, further comprising:
receiving, at the local mobility anchor, the proxy binding update message from the mobile access gateway;
creating a new binding cache entry for the mobile host device;
determining whether there is an existing binding cache entry for the mobile host device;
copying network address information from the existing binding cache entry to the new binding cache entry in an instance in which it is determined that there is an existing binding cache entry for the mobile host device; and
assigning a new network address to the mobile host device and causing storage of network address information indicating the new network address to the new binding cache entry in an instance in which it is determined that there is not an existing binding cache entry for the mobile host device,
wherein the proxy binding acknowledgement message comprises the network address information stored in the new binding cache entry for the mobile host device.

3. A method according to claim 2, further comprising:
receiving, at the mobility access gateway, the proxy binding acknowledgement message from the local mobility anchor;
extracting the network address information from the proxy binding acknowledgement message; and
causing a message comprising the extracted network address information to be sent to the mobile host device.

4. A method according to claim 3, further comprising receiving, from the mobile host device, a data flow binding request message comprising an indication of an existing data flow between the mobile host device and the network domain and indicating a preferred interface of the mobile host device to which the network domain should route the data flow.

5. A method according to claim 2, wherein the network address information stored in the new binding cache comprises a home network prefix associated with the mobile host device.

6. A method according to claim 1, wherein the network domain comprises a network localized mobility management domain.

7. A method comprising:
causing a message to be sent from a mobile host device to a mobility access gateway on a network domain, the message comprising a request that the mobile host device be assigned a common network address for simultaneous use on multiple network interfaces of the mobile host device through which the mobile host device is attached to the network domain;
receiving a message comprising network address information from the mobility access gateway indicating that the mobile host device has been assigned a common network address for simultaneous use on multiple network interfaces of the mobile host device through which the mobile host device is attached to the network domain; and
transmitting a proxy binding acknowledgement message to the mobility access gateway, wherein the proxy binding acknowledgement message comprises network address information indicating the network address assigned to the mobile host device.

8. A method according to claim 7, wherein causing a message to be sent comprises causing a router solicitation message to be sent, the router solicitation message comprising a request that the mobile host device be assigned a common network address for simultaneous use on multiple network interfaces of the mobile host device through which the mobile host device is attached to the network domain.

9. A method according to claim 8, wherein the request comprises an internet control message protocol option.

10. A method according to claim 7, wherein causing a message to be sent comprises causing a data flow binding request message to be sent, the data flow binding request message comprising a request that the mobile host device be assigned a common network address for simultaneous use on multiple network interfaces of the mobile host device through which the mobile host device is attached to the network domain.

11. A method according to claim 7, wherein the request comprises a dynamic host configuration protocol option.

12. A method according to claim 7, further comprising causing a data flow binding request message to be sent to the mobility access gateway, the data flow binding request message comprising an indication of an existing data flow between the mobile host device and the network domain and indicating a preferred network interface of the mobile host device to which the network domain should route the data flow.

13. A computer program product comprising at least one non-transitory computer-readable storage medium having computer-readable program code portions stored therein, the computer-readable program code portions comprising:
a program code portion for receiving, at a mobility access gateway on a network domain, a message from a mobile host device comprising a request that the mobile host device be assigned a common network address for simultaneous use on multiple network interfaces of the mobile host device through which the mobile host device is attached to the network domain;
a program code portion for causing a proxy binding update message to be sent to a local mobility anchor, wherein the proxy binding update message comprises an indication that the mobile host device has been assigned a common network address for use on multiple network interfaces of the mobile host device; and
a program code portion for receiving a proxy binding acknowledgement message from the local mobility anchor comprising network address information indicating the network address assigned to the mobile host device.

14. A computer program product according to claim 13, further comprising:
a program code portion for extracting the network address information from the proxy binding acknowledgement message; and
a program code portion for causing a message comprising the extracted network address information to be sent to the mobile host device.

15. A computer program product according to claim 14, further comprising a program code portion for receiving, from the mobile host device, a data flow binding request message comprising an indication of an existing data flow between the mobile host device and the network domain and indicating a preferred interface of the mobile host device to which the network domain should route the data flow.

16. A computer program product comprising at least one non-transitory computer-readable storage medium having computer-readable program code portions stored therein, the computer-readable program code portions comprising:
a program code portion for causing a message to be sent from a mobile host device to a mobility access gateway on a network domain, the message comprising a request that the mobile host device be assigned a common network address for simultaneous use on multiple network interfaces of the mobile host device through which the mobile host device is attached to the network domain;

a program code portion for receiving a message comprising network address information from the mobility access gateway indicating that the mobile host device has been assigned a common network address for simultaneous use on multiple network interfaces of the mobile host device through which the mobile host device is attached to the network domain; and a program code portion for transmitting a proxy binding acknowledgement message to the mobility access gateway, wherein the proxy binding acknowledgement message comprises network address information indicating the network address assigned to the mobile host device.

17. An apparatus comprising at least one processor and at least one memory storing computer program code, wherein the at least one memory and stored computer program code are configured, with the at least one processor, to cause the apparatus to at least:

receive a message from a mobile host device comprising a request that the mobile host device be assigned a common network address for simultaneous use on multiple network interfaces of the mobile host device through which the mobile host device is attached to a network domain;

cause a proxy binding update message to be sent to a local mobility anchor, wherein the proxy binding update message comprises an indication that the mobile host device has been assigned a common network address for use on multiple network interfaces of the mobile host device; and receive a proxy binding acknowledgement message from the local mobility anchor comprising network address information indicating the network address assigned to the mobile host device.

18. An apparatus according to claim 17, wherein the at least one memory and stored computer program code are configured, with the at least one processor, to further cause the apparatus to:

extract the network address information from the proxy binding acknowledgement message; and cause a message comprising the extracted network address information to be sent to the mobile host device.

19. An apparatus comprising at least one processor and at least one memory storing computer program code, wherein the at least one memory and stored computer program code are configured, with the at least one processor, to cause the apparatus to at least:

cause a message to be sent from a mobile host device to a mobility access gateway on a network domain, the message comprising a request that the mobile host device be assigned a common network address for simultaneous use on multiple network interfaces of the mobile host device through which the mobile host device is attached to the network domain;

receive a message comprising network address information from the mobility access gateway indicating that the mobile host device has been assigned a common network address for simultaneous use on multiple network interfaces of the mobile host device through which the mobile host device is attached to the network domain; and transmit a proxy binding acknowledgement message to the mobility access gateway, wherein the proxy binding acknowledgement message comprises network address information indicating the network address assigned to the mobile host device.

20. An apparatus according to claim 19, wherein the at least one memory and stored computer program code are configured, with the at least one processor, to further cause the apparatus to cause a data flow binding request message be sent to the mobility access gateway, the data flow binding request message comprising an indication of an existing data flow between the mobile host device and the network domain and indicating a preferred network interface of the mobile host device to which the network domain should route the data flow.

* * * * *